United States Patent
Park et al.

(10) Patent No.: US 11,835,457 B2
(45) Date of Patent: Dec. 5, 2023

(54) FLUORESCENT COMPOSITION FOR DETECTING BIOLOGICAL MATERIAL

(71) Applicant: Bioacts Corporation, Incheon (KR)

(72) Inventors: Jin Woo Park, Incheon (KR); Kiwon Kim, Incheon (KR); HyungJun Yoon, Incheon (KR); Eunae Jeong, Incheon (KR); Hyejin Jin, Incheon (KR); Yoeseph Cho, Incheon (KR)

( * ) Notice: Subject to any disclaimer, the term of this patent is extended or adjusted under 35 U.S.C. 154(b) by 494 days.

(21) Appl. No.: 17/151,680

(22) Filed: Jan. 19, 2021

(65) Prior Publication Data

US 2022/0228985 A1 Jul. 21, 2022

(51) Int. Cl.
*G01N 21/64* (2006.01)
*C09K 11/06* (2006.01)

(52) U.S. Cl.
CPC .......... *G01N 21/6428* (2013.01); *C09K 11/06* (2013.01); *C09K 2211/1018* (2013.01); *G01N 2021/6439* (2013.01)

(58) Field of Classification Search
CPC .................................................. G01N 21/6428
See application file for complete search history.

(56) References Cited

U.S. PATENT DOCUMENTS

| | | | | |
|---|---|---|---|---|
| 9,850,382 | B1 * | 12/2017 | Ying | ................... C09B 23/0008 |
| 11,667,961 | B2 * | 6/2023 | Park | ..................... C12Q 1/6848 |
| | | | | 435/6.12 |

* cited by examiner

*Primary Examiner* — Golam M Shameem

(57) ABSTRACT

Disclosed is a fluorescent composition for whole blood analysis capable of predicting the diagnosis, treatment and prognosis of diseases through blood analysis. In the case of using the fluorescent composition of exemplary embodiments of the present invention for whole blood analysis, the shape of a target material such as red blood cells and white blood cells may be maintained as it is and non-target biomaterials and the like may be dissolved to increase the sensitivity and affinity to the target and improve the staining efficiency of the blood cell nucleic acids, thereby increasing the fluorescent efficiency. Therefore, more accurate blood cell analysis is possible than conventional techniques, and through this, it is possible to accurately predict not only the diagnosis of the disease, but also the treatment method and prognosis.

12 Claims, 3 Drawing Sheets

FLUORESCENT COMPOSITION FOR DETECTING BIOLOGICAL MATERIAL

BACKGROUND

Field

Embodiments of the present invention relate to a fluorescent composition for whole blood analysis capable of predicting diagnosis, treatment, and prognosis of diseases through blood analysis, wherein the composition includes both a fluorescent compound and a surfactant compound. Particularly, in the case of using the fluorescent composition of the present invention for whole blood analysis, other organisms other than a target biological material are dissolved to improve the efficiency of a fluorescent signal, thereby diagnosing diseases more accurately than related arts.

Description of the Related Art

A complete blood cell count (CBC) is one of the most basic tests prescribed by a doctor or during a medical examination conducted for the purpose of checking an infection status, a blood coagulation ability, presence and causes of anemia, abnormalities in the urinary system, abnormalities in the circulatory system, etc. by determining diagnosis or follow-up observation of blood diseases, increases or decreases in blood count or morphological abnormalities.

Test items for the CBC basically include white blood cells (WBC), red blood cells (RBC), hemoglobin (HGB), hematocrit (HCT), mean corpuscular volume (MCV), mean corpuscular hemoglobin (MCH), mean corpuscular hemoglobin concentration, and platelet (PLT). Although there are differences depending on age, sex, country, place of residence, inspection method and inspection apparatuses, it is common that a kind of standard value is presented for each test item.

Whole blood analysis is the most basic test as 35% or more of patients in hospitals are using, and has been used as basic data for diagnosis and treatment of not only specific diseases but also other associated diseases, so that the medical industry market and application values are very high. However, despite of using hemocytometers automated for the CBC in most hospitals, there is no domestic analysis apparatuses, and reagents for blood analysis used herein are also imported, and thus, it is urgent to domesticize the reagents.

Although there are differences between manufacturers of hemocytometers, dedicated reagents are used to analyze whole blood samples in an appropriate method. Uses of these reagents include DNA, RNA and leukocyte staining using fluorescent dyes, hematotysis, hemoglobin oxidation reagents, dilution of blood samples, cleaning and attaching of proteins and hemolytic components, sheath reagents for arranging blood cells in a line at a measurement site, and the like.

As mainly used optical analysis apparatuses, there are apparatuses for research purposes, such as a fluorescence microscope, a confocal microscope, a flow cytometer, a micro array, and a quantitative polymerase chain reaction system (qualitative PCR system) for cell observation, and an electrophoresis device, a real-time in vivo imaging system, etc. for isolation and analysis of nucleic acids and proteins. In addition, there are known apparatuses for diagnosis and treatment, such as nucleic acid and protein diagnostic kit (or biochip)-based in vitro diagnosis apparatuses combined with immunoassay assay or PCR analysis and statistical technology, operating tables and endoscopic apparatuses for image-guided surgery, and the like. New applications and apparatuses with higher levels of resolution and data processing capabilities have constantly been developed.

In general, most of fluorescent dyes used for labeling biomolecules, such as blood analysis, and protein or peptide analysis include structures of anthranilate, 1-alkylthic isoindoles, pyrrolinones, bimanes, benzoxazole, benzimidazole, benzofurazan, naphthalenes, coumarins, cyanine, stilbenes, carbazoles, phenanthridine, anthracenes, bodipy, fluoresceins, eosins, rhodamines, pyrenes, chrysenes, and acridines.

Dyes that may be mainly applied in the bio field should have preferably less photobleaching and quenching in aqueous or hydrophilic conditions, and have a large molecular extinction coefficient to absorb a large amount of light. In addition, the dyes should be in a visible or near infrared region of 500 nm or more far from a fluorescent range of the biomolecule itself, and be stable under various pH conditions, but structures of dyes that can be used for labeling the biomolecules capable of satisfying the above limitations are limited.

Fluorescent chromogens meeting these requirements include cyanine, rhodamine, fluorescein, bodify, coumarin, acridine, and pyrene derivatives, and are also introduced with reactive groups so as to be combined with a dye alone or a specific substituent in the biomolecular structure, and among them, xanthane-based fluorescein and rhodamine, and polymethine-based cyanine derivative dye compounds are mainly commercialized.

In particular, dye compounds having a cyanine chromophore have not only an advantage that it is easy to synthesize compounds of various absorption/excitation wavelengths, but also have generally many advantages of having excellent optical and pH stability, a narrow absorption/emission wavelength range, a fluorescent region of 500 to 800 nm, which does not overlap with a fluorescent region of the biomolecule itself, so that the analysis is easy, and a high molecular extinction coefficient even if there are some differences depending on the solvent and solubility characteristics, etc. Thus, the dye compounds having the cyanine chromophore are widely used in biological applications.

However, the conventional dye compounds as described above are not only unstable in terms of storage stability, but also have a problem in that fluorescent properties are rapidly deteriorated with storage stability over time after being labeled on the biomolecules. Therefore, in order to overcome this problem and be usefully applied industrially, it is important to develop a novel fluorescent dye that has excellent optical and pH stability, has an absorption/emission wavelength range in a specific wavelength range, and exhibits a high molecular extinction coefficient.

In addition, in order to analyze organisms such as blood using a fluorescent probe or the like, the shape, size, pattern, maturity, and the like of the blood and the like should be maintained for a long time. In particular, in order to minimize noise so that the organism to be analyzed may be selectively analyzed, except for a target organism, other organisms need to be dissolved or decomposed.

Since the fluorescent composition used for the whole blood analysis which has been used in the related art does not contain a useful surfactant, the shape of the target blood cells such as red blood cells and white blood cells is maintained as it is and only non-target biomaterials need to be dissolved. However, since there is a problem in that non-target materials are maintained as they are or even the target material is dissolved, efforts to solve this problem have been continuously made.

The above-described technical configuration is the background art for assisting the understanding of the present invention, and does not mean a conventional technology widely known in the art to which the present invention belongs.

SUMMARY

The present inventors have developed a fluorescent composition including a fluorescent compound capable of specifically staining only blood cells and a surfactant capable of selectively dissolving non-target materials in the fluorescent composition used for diagnosing diseases by detecting a biological material in the bio field such as whole blood analysis, protein analysis, etc. as described above and completed the present invention. Particularly, embodiments of the present invention are to provide a fluorescent composition for whole blood analysis with excellent selectivity and sensitivity capable of maintaining the shape of blood cells to be analyzed in whole blood analysis and dissolving other blood cells and structural materials which are not analyzed.

Further, the fluorescent compound provided in exemplary embodiments of the present invention has high efficiency of binding to nucleic acids or the like in blood cells to solve a problem of the conventional fluorescent compound that the stability and the fluorescent efficiency are rapidly deteriorated over time.

An object of the present invention is to provide a fluorescent composition for analyzing nucleic acids such as DNA and RNA, including the cyanine-based fluorescent compound and a surfactant compound capable of selectively dissolving blood cells.

In order to solve the above problems, the present invention applies a fluorescent compound represented by Chemical Formula 1 below.

[Chemical Formula 1]

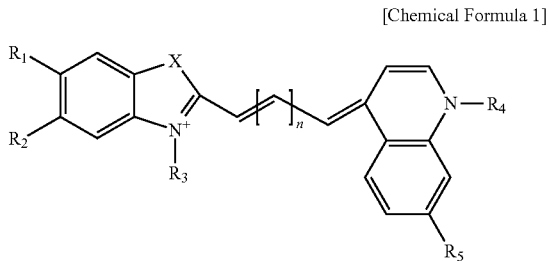

Wherein, X is sulfur, $R_1$ is hydrogen or alkoxy having 1 to 5 carbon atoms, $R_2$ is hydrogen, bromine or chlorine, $R_3$ is phenyl substituted with alkyl having 1 to 5 carbon atoms, alcohol having 1 to 5 carbon atoms, or alkyl having 1 to 5 carbon atoms, $R_4$ is selected from phenyl substituted with alkyl having 1 to 8 carbon atoms, alcohol having 1 to 5 carbon atoms, dialcohol having 1 to 5 carbon atoms, or alkyl having 1 to 5 carbon atoms, phenyl substituted with a carboxyl group having 1 to 5 carbon atoms, and phenyl substituted with boronic acid, $R_5$ is hydrogen, bromine or chlorine, and n is an integer of 1 to 5.

Further, in order to solve the above problems, the present invention applies a surfactant compound represented by Chemical Formula 2 below.

[Chemical Formula 2]

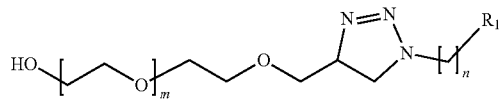

Wherein, m is an integer of 1 to 25, n is an integer of 1 to 20, and $R_1$ is selected from substituted or unsubstituted alkyl having 1 to 12 carbon atoms, substituted or unsubstituted amine having 1 to 12 carbon atoms, carboxylic acid having 1 to 6 carbon atoms, sulfonic acid, imido ester, maleimide, succinimidyloxyl, ethenesulfony, and alkylaminyl having 1 to 6 carbon atoms.

The compound of Chemical Formula 2 may form a salt with halogen or sulfuric acid.

The fluorescent composition provided in the present invention relates to a fluorescent composition for whole blood analysis capable of predicting the diagnosis, treatment and prognosis of diseases through blood analysis. By using the composition provided in the present invention, the shape of blood cells such as red blood cells and white blood cells may be maintained as it is and the staining efficiency of nucleic acids in the blood cells may be improved to increase the fluorescence efficiency, thereby diagnosing the diseases more accurately than the related arts.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
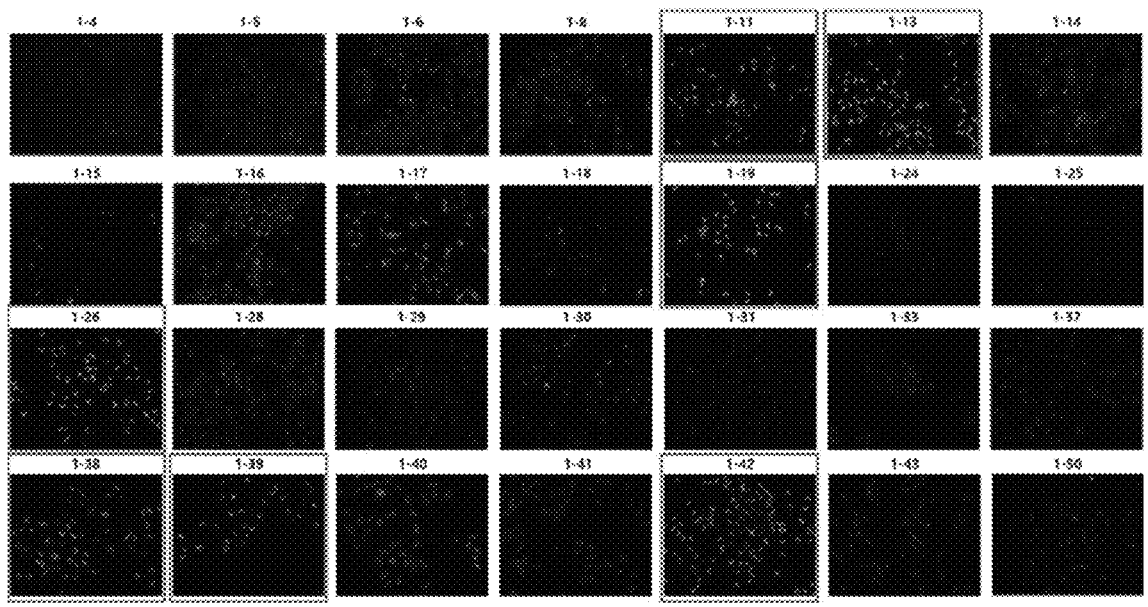
FIG. 1 shows a fluorescence microscopic analysis picture of living cells for confirming that a fluorescent compound provided in exemplary embodiments of the present invention is stained on nucleic acids of cells.

Hereinafter, a preparation method of a fluorescent compound and a surfactant compound of the present invention, the fluorescence efficiency of the composition of the present invention, and the like will be described in detail by using Examples of the present invention.

Hereinafter, exemplary embodiments of the present invention will be described in more detail with reference to the following Examples. However, the following Examples should not be construed as limiting the scope of the present invention and will be described to help in the understanding of the present invention.

First, exemplary embodiments of the present invention may use a fluorescent compound represented by Chemical Formula 1 below.

[Chemical Formula 1]

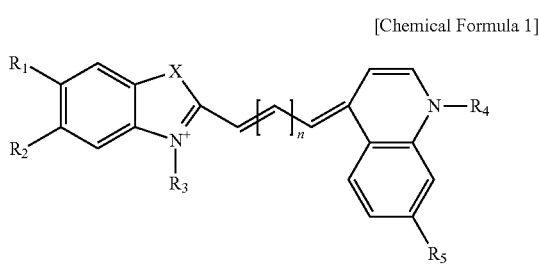

Wherein, X is sulfur, $R_1$ is hydrogen or alkoxy having 1 to 5 carbon atoms, $R_2$ is hydrogen, bromine or chlorine, $R_3$ is phenyl substituted with alkyl having 1 to 5 carbon atoms, alcohol having 1 to 5 carbon atoms, or alkyl having 1 to 5 carbon atoms, $R_4$ is selected from phenyl substituted with alkyl having 1 to 8 carbon atoms, alcohol having 1 to 5 carbon atoms, dialcohol having 1 to 5 carbon atoms, or alkyl having 1 to 5 carbon atoms, phenyl substituted with a carboxyl group having 1 to 5 carbon atoms, and phenyl substituted with boronic acid.

$R_5$ is hydrogen, bromine or chlorine, and n is an integer of 1 to 5.

A preparation method of the compound contained in Chemical Formula 1 will be described.

Example 1: Synthesis of Fluorescent Compound 1-1

Synthesis of Compound 2-1

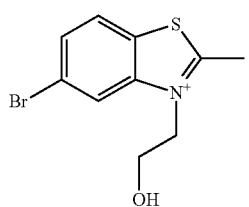

5-bromo-2-methylbenzothiazole (1597 mg, 7.0 mmol, 1 eq) was dissolved in 5 ml of toluene, 2-iodoethanol (0.8 ml, 10.3 mmol, 1.47 eq) was added, and then stirred overnight at 115° C. Benzene and diethyl ether were added to the reaction solution, and then the obtained particles were filtered and dried. The dried compound was purified using a silica gel column to obtain Compound 2-1 (1.25 g, 45%).

(Synthesis of Compound 3-1)

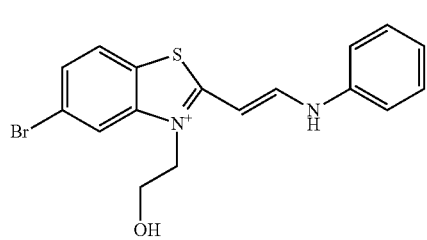

The Compound 2-1 (100 mg, 348 umol, 1 eq) was dispersed in 6 ml of acetic acid. N,N-diphenylformamidine (68 mg, 348 umol, 1 eq) was added, and then the reaction was performed at 100° C. for 2 hours. After confirming the reaction, the mixture was cooled to room temperature, and then freeze-dried. The material obtained after freeze-drying was completed was used for the next reaction (100%).

Synthesis of Compound 4-1

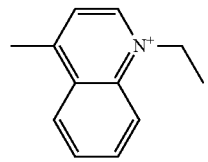

Lepidine (1 ml, 7.56 mmol, 1 eq) was completely dissolved in 4 ml of toluene, and then iodoethane (0.9 ml, 11:34 mmol, 1.5 eq) was added. The reaction solution was stirred at 1155° C. for 18 hours. Benzene and diethyl ether were added to the reaction solution in a slurry state to form particles. The formed particles were filtered and dried to obtain Compound 4-1 (1.5 g, 67%).

Synthesis of Compound 1-1

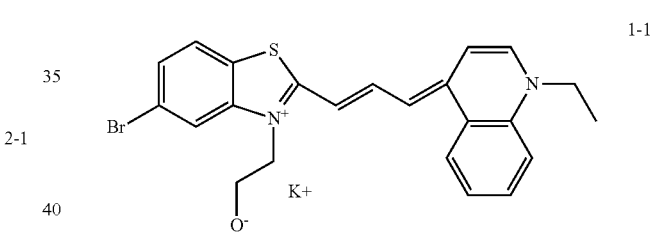

The Compound 3-1 (348 umol) and Compound 4-1 (60 mg, 348 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-1 (42 mg, 24.5%).

Example 2: Synthesis of Fluorescent Compound 1-2

Synthesis of Compound 4-2

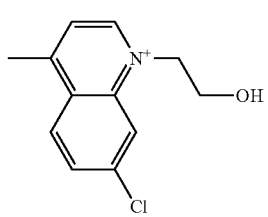

7-bromo-4-methylbenzothiazole (868 mg, 4.89 mmol, 1 eq) was dissolved in 5 ml of toluene, and then 2-iodoethanol (0.49 ml, 6.37 mmol, 1.3 eq) was added. The reaction solution in a slurry state was added with benzene and diethyl ether, solidified, and dried under reduced pressure to obtain Compound 4-2 (1,500 mg, 88% yield).

Synthesis of Compound 1-2

1-2

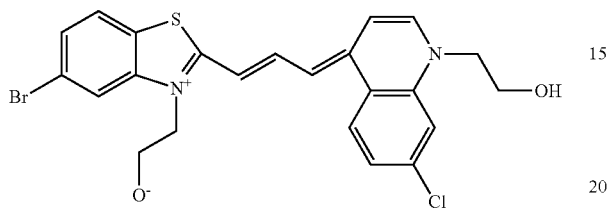

The Compound 3-1 (348 umol) and Compound 4-2 (78 mg, 348 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-2 (63 mg, 35.9%).

Example 3: Synthesis of Fluorescent Compound 1-3

Synthesis of Compound 4-3

4-3

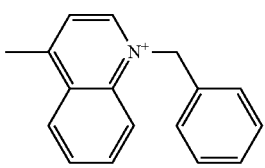

Lepidine (1.0 mL, 7.56 mmol) was dissolved in toluene (4 mL) and benzyl bromide (1.1 mL, 9.11 mmol) was added. The reaction solution was stirred at 115° C. for 18 hours. The reaction solution in a slurry state was added with benzene and Et$_2$O, solidified, and dried under reduced pressure to obtain Compound 4-3 as a gray solid (2.3 g, 97%).

Synthesis of Compound 1-3

1-3

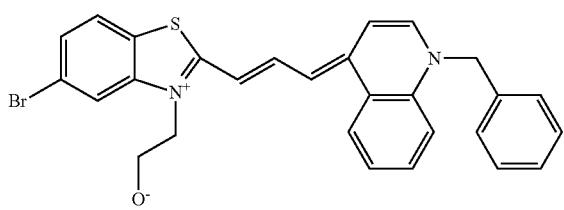

The Compound 3-1 (348 umol) and Compound 4-3 (82 mg, 348 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-3 (76 mg, 42.4%).

Example 4: Synthesis of Fluorescent Compound 1-4

Synthesis of Compound 4-4

4-4

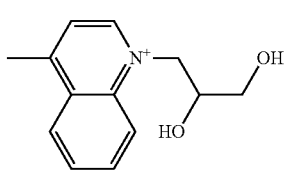

Lepidine (1.0 mL, 7.56 mmol) was dissolved in toluene (4 mL) and 3-bromo-1,2-propandiol (0.73 mL, 8.32 mmol) was added. The reaction solution was stirred at 115° C. for 18 hours, cooled to room temperature and then extracted twice with benzene and once with Et$_2$O. Organic layers were combined and then evaporated under reduced pressure to obtain a target compound 4-4 as a gray solid (1,784 mg, 88%).

Synthesis of Compound 1-4

1-4

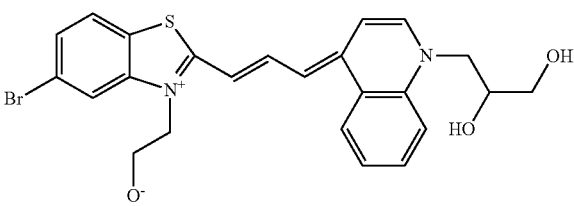

The Compound 3-1 (348 umol) and Compound 4-4 (76 mg, 348 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-4 (39 mg, 27.4%).

Example 5: Synthesis of Fluorescent Compound 1-5

Synthesis of Compound 4-5

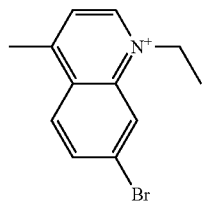

4-5

7-bromo-4-methylquinoline (1,020 mg, 4.59 mmol) was dissolved in toluene (5 mL), and then iodoethane (0.44 mL, 5.51 mmol) was added. The reaction solution in a slurry state was added with benzene and Et$_2$O, solidified, and dried under reduced pressure to obtain Compound 4-5 as a gray solid (1,200 mg, 69%).

Synthesis of Compound 1-5

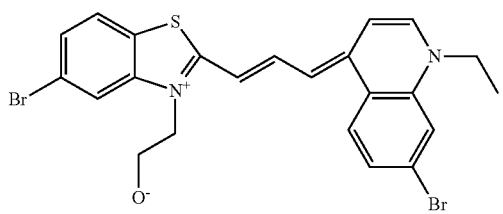

1-5

The Compound 3-1 (348 umol) and Compound 4-5 (87 mg, 348 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-5 (55 mg, 29.7%).

Example 6: Synthesis of Fluorescent Compound 1-6

Synthesis of Compound 2-2

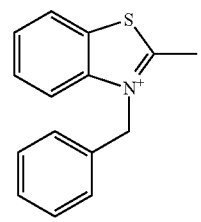

2-2

2-methylbenzothiazole (1.0 mL, 7.91 mmol) was dissolved in toluene (4 mL) and then benzyl bromide (1.1 mL, 9.49 mmol) was added. In a capped vial, the reaction solution was stirred at 115° C. for 20 hours. Benzene and Et$_2$O were used twice each to solidify the reaction solution in a slurry state. The obtained solid was dried under reduced pressure to obtain Compound 2-2 as a brown solid (1.5 g, 63%).

Synthesis of Compound 3-2

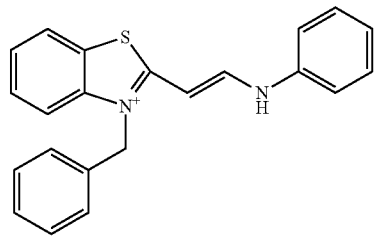

3-2

The Compound 2-2 (100 mg, 416 umol, 1 eq) was dispersed in 10 ml of acetic acid. N,N-diphenylformamidine (82 mg, 416 umol, 1 eq) was added, and then the reaction was performed at 100° C. for 2 hours. After confirming the reaction, the mixture was cooled to room temperature, and then freeze-dried. The material obtained after freeze-drying was completed was used for the next reaction (100%).

Synthesis of Compound 1-6

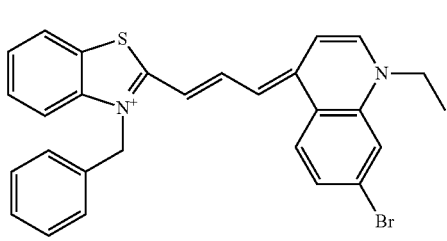

1-6

The Compound 3-2 (416 umol) and Compound 4-5 (104 mg, 416 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-6 (80 mg, 38.4%).

Example 7: Synthesis of Fluorescent Compound 1-7

Synthesis of Compound 1-7

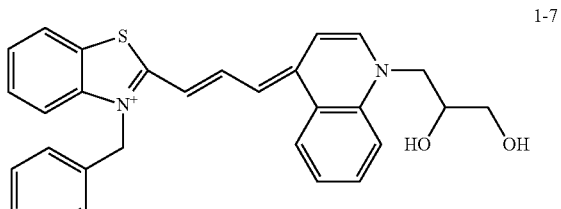

1-7

The Compound 3-2 (416 umol) and Compound 4-4 (91 mg, 416 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-7 (54 mg, 27.8%).

Example 8: Synthesis of Fluorescent Compound 1-8

Synthesis of Compound 1-8

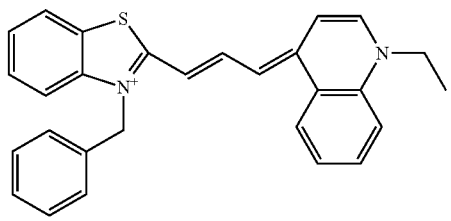

1-8

The Compound 3-2 (416 umol) and Compound 4-1 (73 mg, 416 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-8 (56 mg, 27.8%).

Example 9: Synthesis of Fluorescent Compound 1-9

Synthesis of Compound 1-9

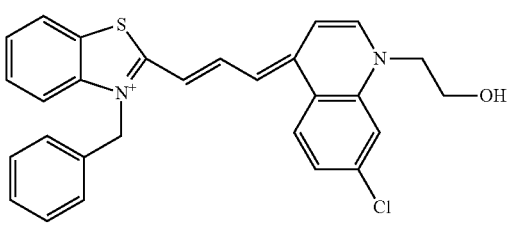

1-9

The Compound 3-2 (416 umol) and Compound 4-2 (93 mg, 416 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-9 (53 mg, 27.0%).

Example 10: Synthesis of Fluorescent Compound 1-10

Synthesis of Compound 4-6

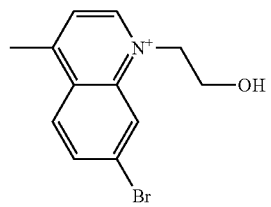

4-6

7-bromo-4-methylquinoline (1,038 mg, 4.67 mmol) was dissolved in toluene (5 mL), and then 2-iodoethane (0.47 mL, 6.07 mmol) was added. The reaction solution in a slurry state was added with benzene and $Et_2O$, solidified, and dried under reduced pressure to obtain Compound 4-6 as a gray solid (1,700 mg, 92%).

Synthesis of Compound 1-10

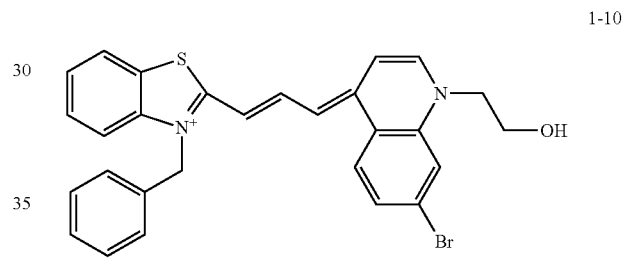

1-10

The Compound 3-2 (416 umol) and Compound 4-6 (111 mg, 416 umol, 1 eq) were mixed with 10 ml of pyridine and stirred. After the reaction was performed at 80° C. for 3 hours, the mixture was cooled to room temperature and dried under reduced pressure. The compound obtained after drying was purified using a silica gel column to obtain Compound 1-10 (70 mg, 32.6%).

In addition to the compounds described above, as a fluorescent compound of the fluorescent composition provided in the present invention, the compound included in Chemical Formula 1 above may be compounds represented by the following Chemical Formulas.

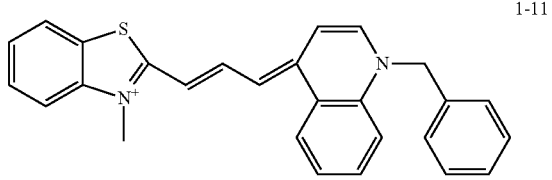

1-11

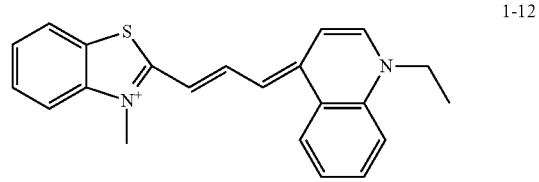

1-12

1-13
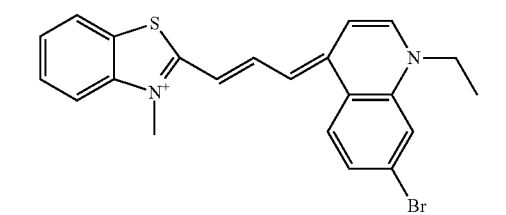
1-14
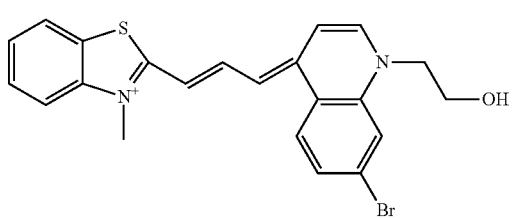
1-15
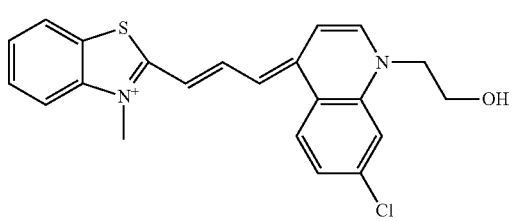
1-16
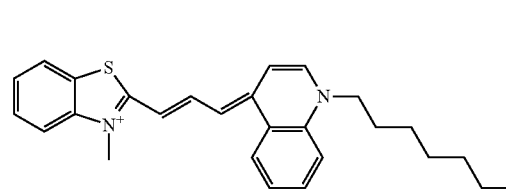
1-17
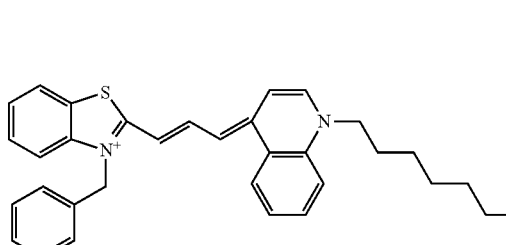
1-18
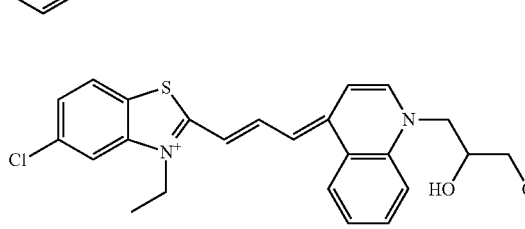
1-19
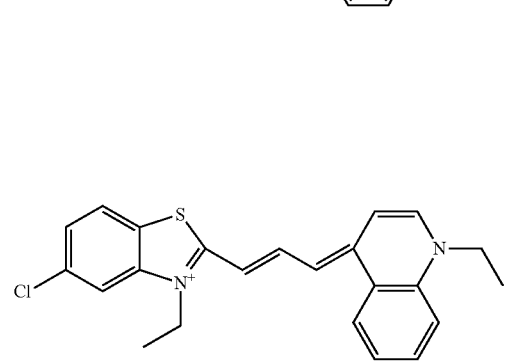
1-20
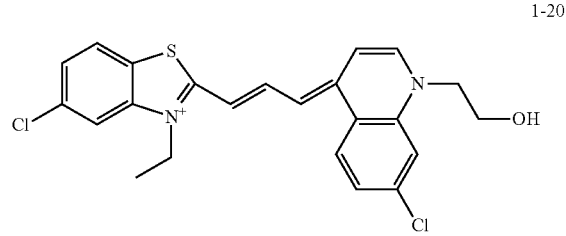
1-21
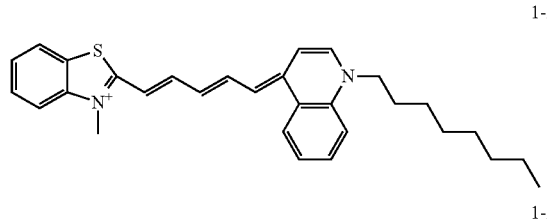
1-22
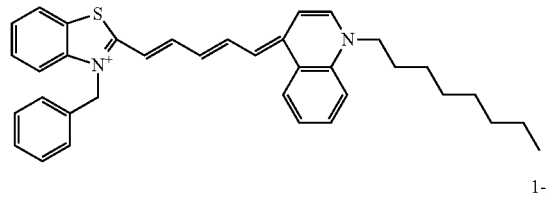
1-23
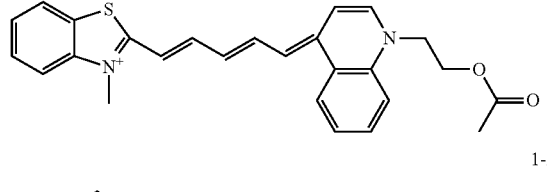
1-24
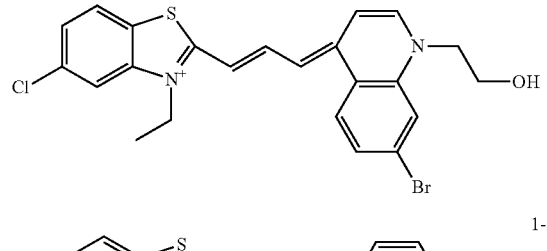
1-25
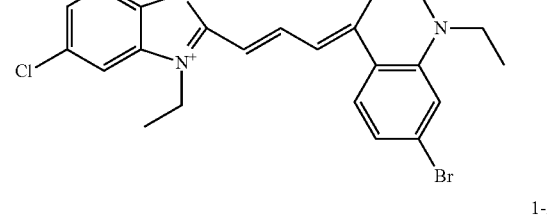
1-26
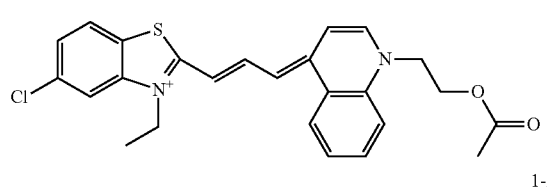
1-27
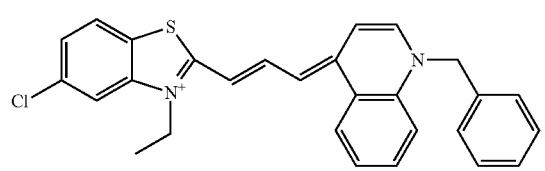

-continued
1-28
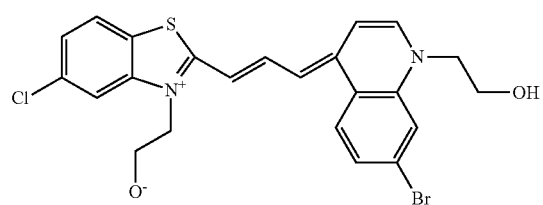
1-29
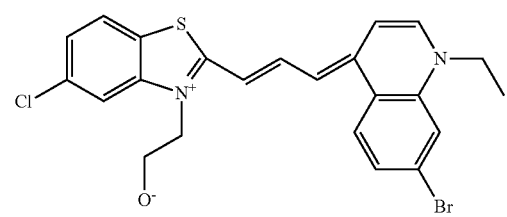
1-30
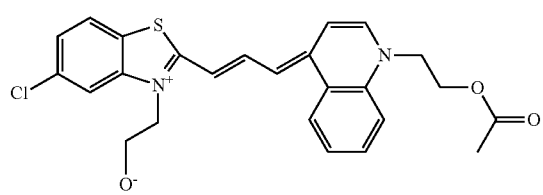
1-31
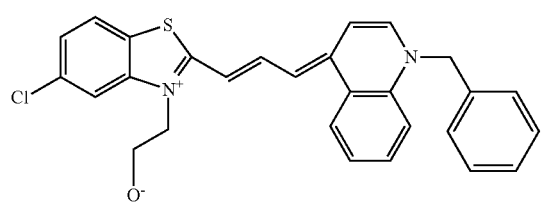
1-32
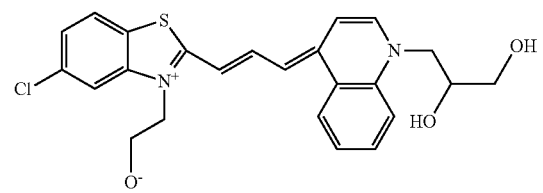
1-33
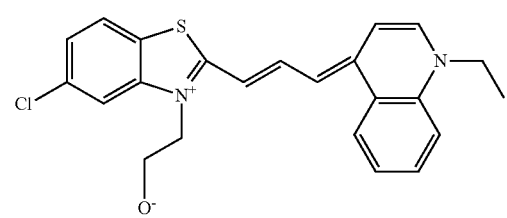
1-34
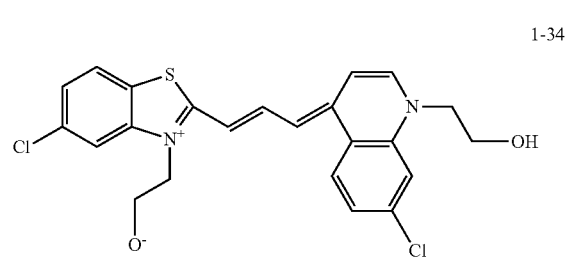
-continued
1-35
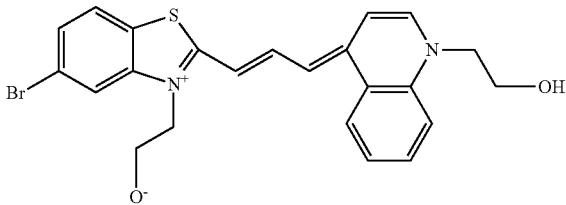
1-36
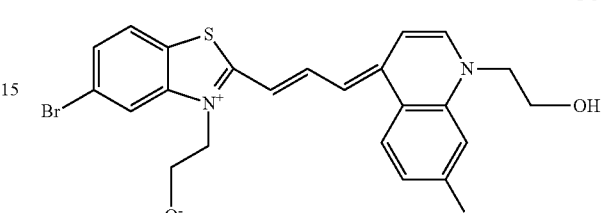
1-37
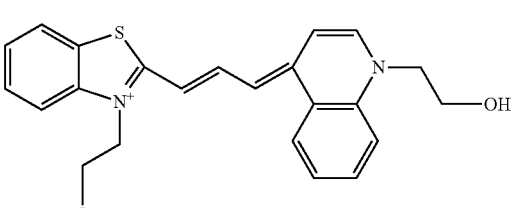
1-38
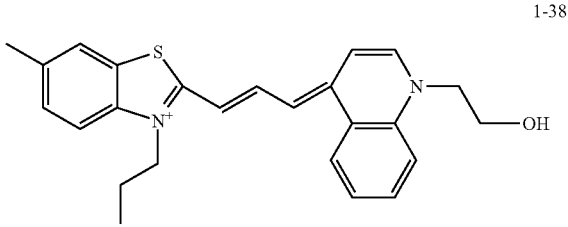
1-39
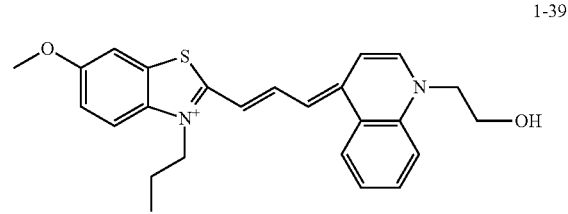
1-40
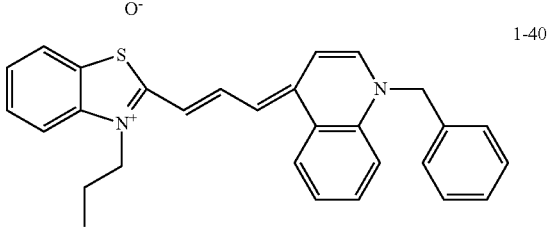
1-41
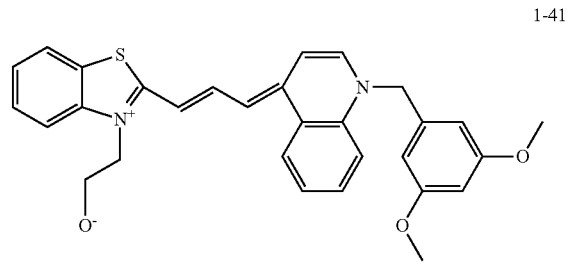

1-42
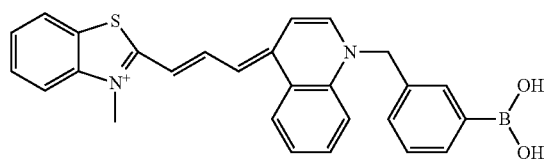
1-43
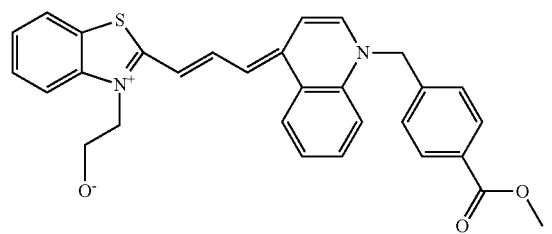
1-44
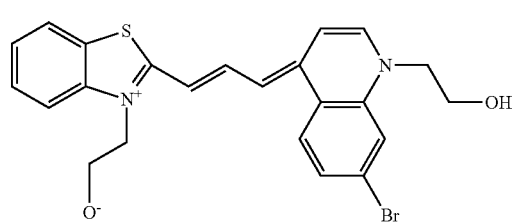
1-45
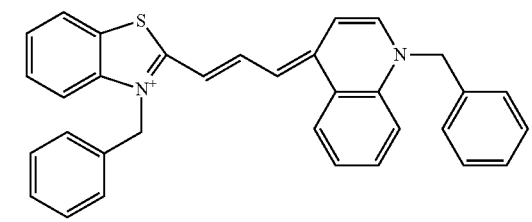
1-46
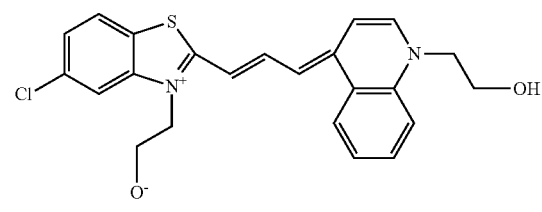
1-47
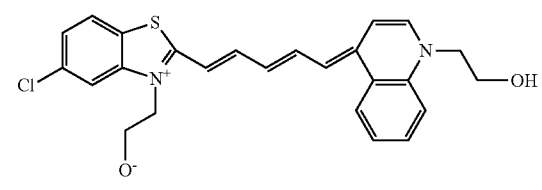
1-48
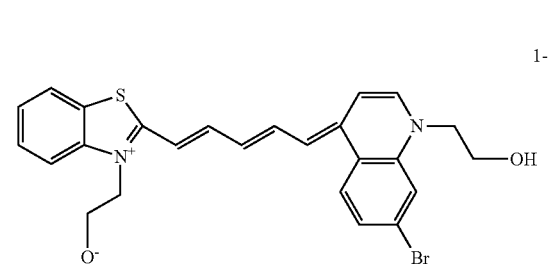
1-49
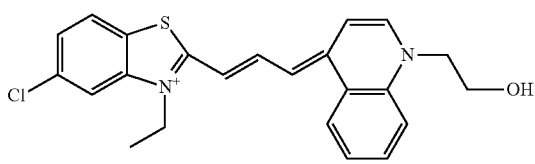
1-50
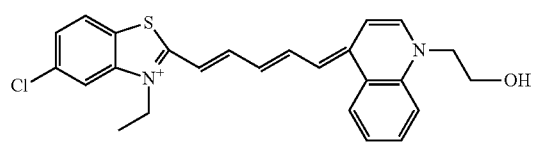
1-51
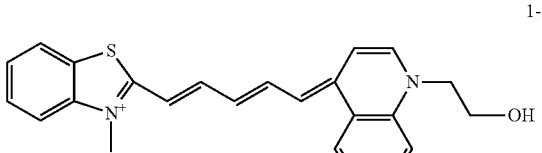
1-52
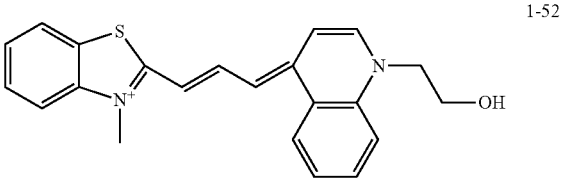
1-53
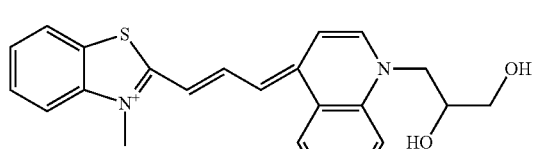
1-54
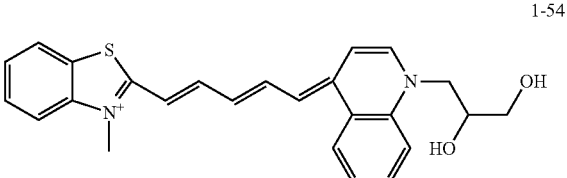
1-55
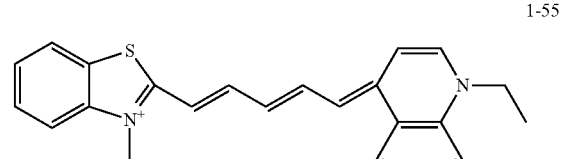
1-56

1-57

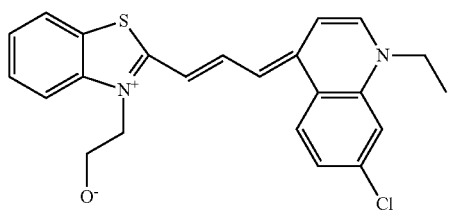

1-58

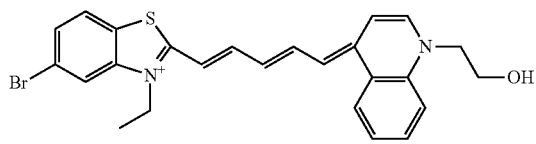

1-59

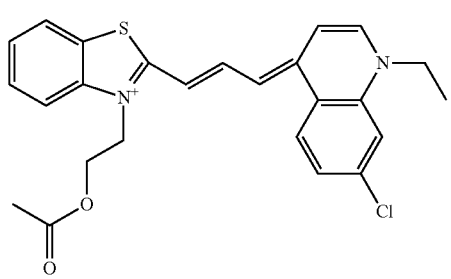

Next, a preparation method of the compound corresponding to Chemical Formula 2 above used as the surfactant compound in the composition of the present invention will be described.

[Chemical Formula 2]

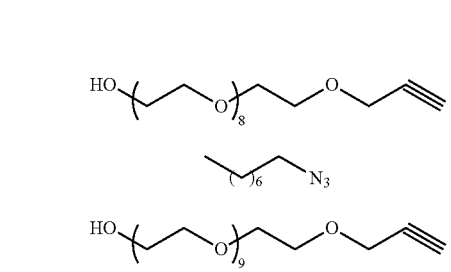

Wherein, m is an integer of 1 to 25, n is an integer of 1 to 20, and $R_1$ is selected from substituted or unsubstituted alkyl having 1 to 12 carbon atoms, substituted or unsubstituted amine having 1 to 12 carbon atoms, carboxylic acid having 1 to 6 carbon atoms, sulfonic acid, imido ester, maleimide, succinimidyloxyl, ethenesulfony, and alkylaminyl having 1 to 6 carbon atoms.

The compound of Chemical Formula 2 may form a salt with halogen or sulfuric acid.

Specific compounds included in Chemical Formula 2 above may be Chemical Formulas 3 and 4 below.

[Chemical Formula 3]

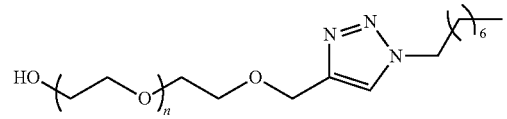

Wherein, n is 8 or 9.

[Chemical Formula 4]

HO$\left(\phantom{\rule{0.5em}{0ex}}\diagup\diagdown O\right)_{20}$ ⋯ (structure with triazole and $(CH_2)_{12}$)

The compounds of Chemical Formulas 3 and 4 had been shown to exhibit excellent efficacy in hemolysis of red blood cells in the blood.

The compound of Chemical Formula 3 is a compound when n is 8 or 9 in the compounds of Chemical Formula 2, which may be prepared using the following Chemical Formulas a, b, and c.

a: HO$\left(\diagup\diagdown O\right)_8$—O—propargyl b: $(CH_2)_6$—$N_3$ c: HO$\left(\diagup\diagdown O\right)_9$—O—propargyl In the compounds of Chemical Formula 3, in order to prepare the compound (Compound 3a) when n is 8, first, the Compound a (0.246 g, 0.544 mmol, 1 eq), Compound b (0.169 g, 1.09 mmol, 2 eq), and a small amount of copper acetate were put into a round flask, dissolved in 5 ml of methanol, and stirred in a sonicator for 10 minutes. Thereafter, after extraction with dichloromethane and distilled water, a dichloromethane layer was filtered after removing moisture with magnesium sulfate and then dried by distillation under reduced pressure, and purified with silica gel normal chromatography using dichloromethane/methanol 9:1 as a developing solution to obtain a pure compound represented by the following Chemical Formula (Compound 3a).

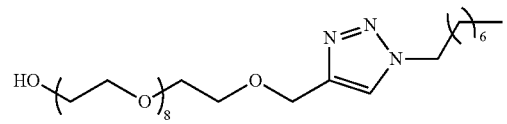

In the compounds of Chemical Formula 3, for preparing the compound 3b, in the compound 3 when n is 9, the Compound b, Compound c, and a small amount of copper acetate were added to a round flask, dissolved in 3 ml of methanol, and then stirred in a sonicator for 20 minutes. Thereafter, after extraction with dichloromethane and distilled water, a dichloromethane layer was filtered after removing moisture with magnesium sulfate and then dried by distillation under reduced pressure, and purified with silica gel normal chromatography using dichloromethane/methanol 10:1 as a developing solution to obtain a pure compound represented by the following Chemical Formula (Compound 3b).

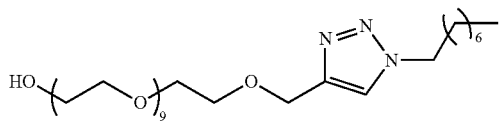

The compound of Chemical Formula 4 may be prepared using the following Compound f and Compound g.

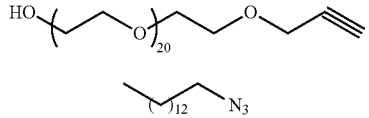

The Compound f (0.208 g, 0.21 mmol. 1 eq), Compound g (0.102 ml, 0.42 mmol, 2 eq) and a small amount of copper acetate were put into a round flask, dissolved in 5 ml of methanol, and then stirred in a sonicator for 20 minutes. Thereafter, after extraction with dichloromethane and distilled water, a dichloromethane layer was filtered after removing moisture with magnesium sulfate and then dried by distillation under reduced pressure, and purified with silica gel normal chromatography using dichloromethane/methanol 10:1 as a developing solution to obtain a pure compound represented by Chemical Formula 4.

Hereinafter, a blood cell staining reagent used for whole blood analysis will be prepared using a representative compound used as the fluorescent compound in the fluorescent composition provided by the present invention, and Test Examples and results of measuring a staining effect of the reagent on blood cells and the fluorescent intensity will be described.

Test Example 1: Preparation of Blood Cell Staining Reagent (1) Preparation of Blood Cell Staining Reagent Using Compound of Chemical Formula 1

A blood cell staining reagent was prepared using methanol and ethylene glycol. A compound was mixed with methanol and ethylene glycol, and a representative compound included in Chemical Formula 1 was selected.

Test Example 2: Confirmation of Nucleic Acid Staining Dyes Through Cell Experiments (1) Fluorescent Microscope Analysis in Living Cells For fluorescent microscopic analysis of HeLa cell lines cultured in a medium environment of Dulbeco's Modified Eagle's Media (hereinafter referred to as DMEM), 10% FBS, and 1% Penicillin/Streptomycin, 1×10$^5$ HeLa cell lines were dispensed into a confocal dish. After 24 hours after dispensing, the medium was replaced with a serum-free DMEM medium, and some dyes of the synthesized compounds were selected, dissolved in DMSO, and treated to be 2.5 uM. Thereafter, the medium was washed with pH 7.4 10 mM Phosphate buffered saline (hereinafter 1×PBS), replaced with a phenol free DMEM medium and analyzed under a fluorescence microscope. The analysis was performed with Nikon ECLIPSE Ti-U under X200, Cy5 filter settings. As shown in FIG. 1, it was confirmed that the nucleic acids of the cells were stained by the fluorescent compounds used in the present invention.

(2) Fluorescent Microscopic Analysis in Fixed Cells

Figure 2:
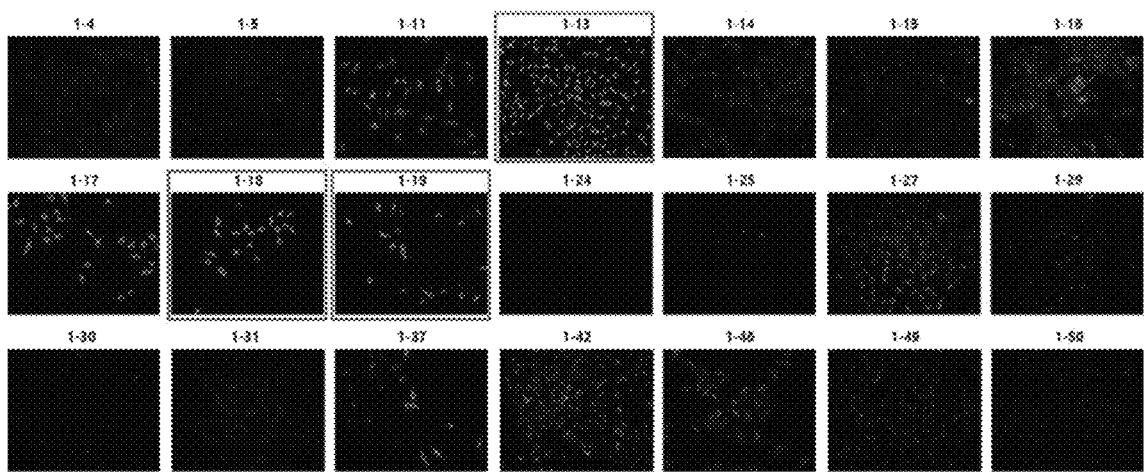
FIG. 2 shows a fluorescence microscopic analysis picture for confirming that the fluorescent compound provided in exemplary embodiments of the present invention is stained on nucleic acids of fixed cells.

For fluorescent microscopic analysis of HeLa cell lines cultured in a medium environment of Dulbeco's Modified Eagle's Media (hereinafter referred to as DMEM), 10% FBS, and 1% Penicillin/Streptomycin, 1×10$^5$ HeLa cell lines were dispensed into a confocal dish. After 24 hours after dispensing, the cells were fixed by treating 4% paraformaldehyde. Thereafter, a nucleic acid staining dye was dissolved in DMSO and treated to be 2.5 uM, washed with pH 7.4 10 mM Phosphate buffered saline (hereinafter 1×PBS), and then analyzed under a fluorescence microscope. The analysis was performed with Nikon ECLIPSE Ti-U under X200, Cy5 filter settings. As shown in FIG. 2, it was confirmed that the nucleic acids of the cells were stained by the fluorescent compounds used in the present invention.

Figure 3:
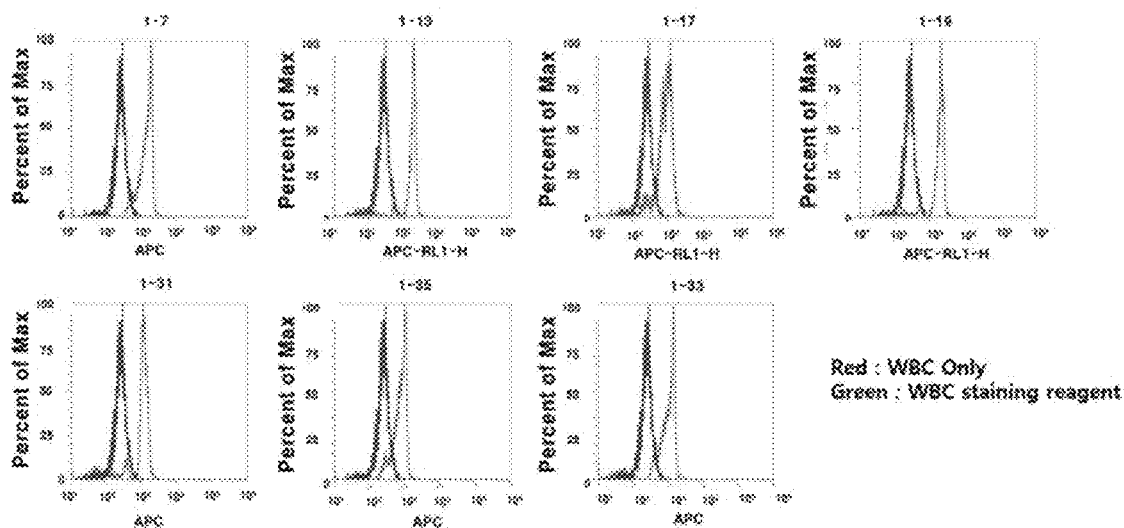
FIG. 3 illustrates an FACS analysis result showing a result of staining white blood cells to verify that the fluorescent compound provided in exemplary embodiments of the present invention is stained on nucleic acids of blood cells.

Test Example 3: Nucleic Acid Staining Dye Analysis Using Blood Cell Staining Reagent FACS Analysis Analysis was performed using Fluorescence Activated Cell Sorting (hereinafter FACS) to verify a blood cell staining reagent prepared using a synthesized nucleic acid staining dye. An analysis sample was prepared by hemolyzing red blood cells using sysmex-4DL in E-check (high concentration), a quality control reagent from Sysmex, removing a supernatant after centrifugation, and then using the remaining white blood cells. The prepared sample was treated with a blood cell staining reagent made of each compound, FACS analysis was performed, and as a control, white blood cells without treatment with a blood cell staining reagent and a comparative material were used. The analysis was measured under conditions of FSC 180, SSC 320, BL1 180, RL1 150, RL2 165, and YL1 200 using Thermo Fisher's Attune N×T equipment, and performed at a wavelength of allophycocyanin (APC). As shown in FIG. 3, it was confirmed that all of the blood cell staining reagents prepared with the nucleic acid staining dyes were stained.

Test Example 4: Review of Hemolytic Efficacy of Surfactant Compound

Microscopic Analysis

Figure 4:
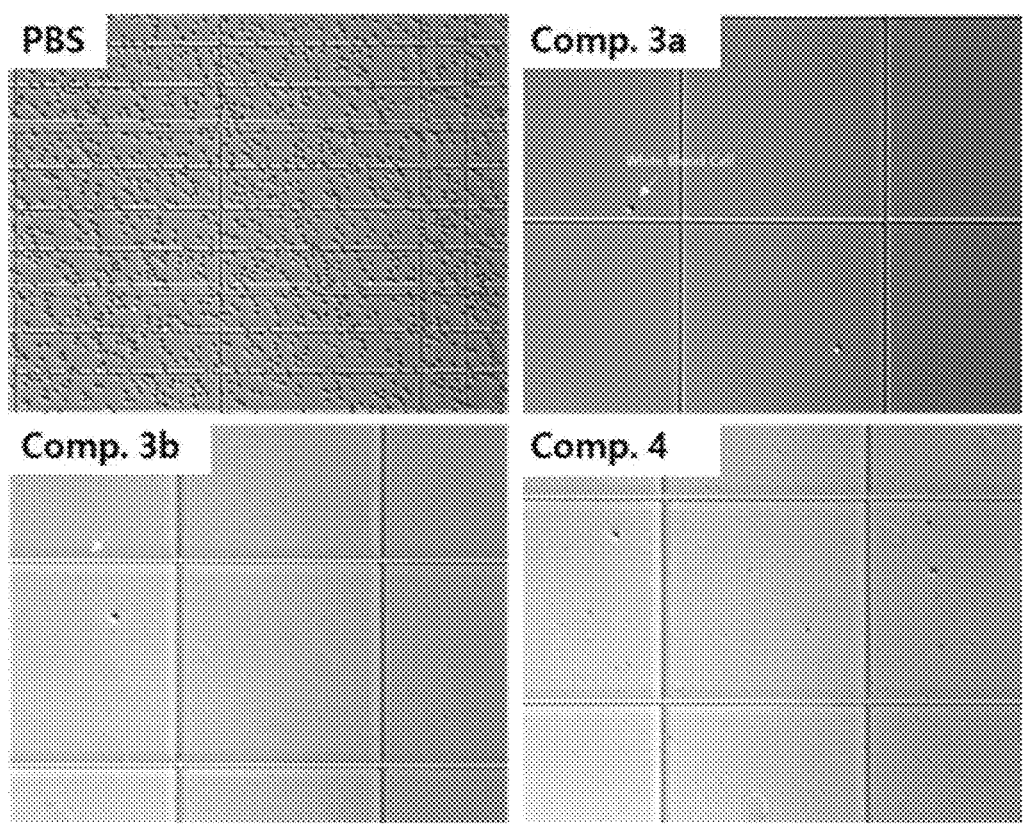
FIG. 4 illustrates that a surfactant compound provided in exemplary embodiments of the present invention hemolyzes red blood cells.

Microscopic analysis was performed to visually confirm the blood hemolysis effect of the blood analysis reagent prepared with the compound of Chemical Formula 3 and the compound of Chemical Formula 4 as the surfactant compound. The blood analysis reagent prepared in E-check (low concentration), a quality control reagent, was treated and microscopic analysis was performed. The analysis was performed with a Nikon ECLIPSE microscope, and measured under X200 DIC filter conditions. As a control, a sample obtained by treating PBS in an E-check reagent was used. As shown in FIG. 4, when using the surfactant compound used in the present invention, compared to the control, it was confirmed that hemolysis of red blood cells was well performed, and among the compounds, Compound 3b was the most cleanly hemolyzed.

As described above, the fluorescent composition provided in the present invention can clearly detect only a target biological material by hemolyzing non-target materials during blood cell analysis.

The present invention is not limited by the Examples described above, and various modifications and changes can be made by those skilled in the art, and in addition, the present invention can be used in various biological and chemical fields, and these application areas are also included in the purpose and scope of the present invention.

12. The fluorescent composition of claim 1, wherein the compound of Chemical Formula 2 is selected from compounds represented by the following Chemical Formula 4
[Chemical Formula 4]
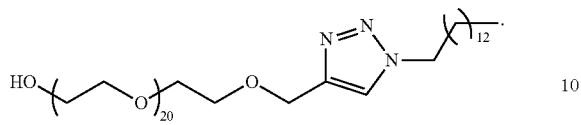

What is claimed is:

1. A fluorescent composition for detecting a biological material formed by including a compound represented by the following Chemical Formula 1 and a compound represented by the following Chemical Formula 2, or a salt thereof,

[Chemical Formula 1]

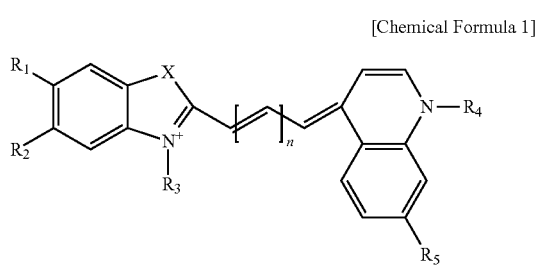

Wherein, X is sulfur, $R_1$ is hydrogen or alkoxy having 1 to 5 carbon atoms,
$R_2$ is hydrogen, bromine or chlorine,
$R_3$ is phenyl substituted with alkyl having 1 to 5 carbon atoms, alcohol having 1 to 5 carbon atoms, or alkyl having 1 to 5 carbon atoms,
$R_4$ is selected from phenyl substituted with alkyl having 1 to 8 carbon atoms, alcohol having 1 to 5 carbon atoms, dialcohol having 1 to 5 carbon atoms, or alkyl having 1 to 5 carbon atoms, phenyl substituted with a carboxyl group having 1 to 5 carbon atoms, and phenyl substituted with boronic acid,
$R_5$ is hydrogen, bromine or chlorine, and n is an integer of 1 to 5,

[Chemical Formula 2]

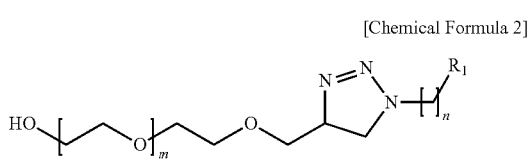

Wherein, m is an integer of 1 to 25, n is an integer of 1 to 20, and $R_1$ is selected from substituted or unsubstituted alkyl having 1 to 12 carbon atoms, substituted or unsubstituted amine having 1 to 12 carbon atoms, carboxylic acid having 1 to 6 carbon atoms, sulfonic acid, imido ester, maleimide, succinimidyloxyl, ethenesulfony, and alkylaminyl having 1 to 6 carbon atoms.

2. The fluorescent composition of claim 1, wherein the compound of Chemical Formula 1 is any one selected from compounds represented by the following Chemical Formula

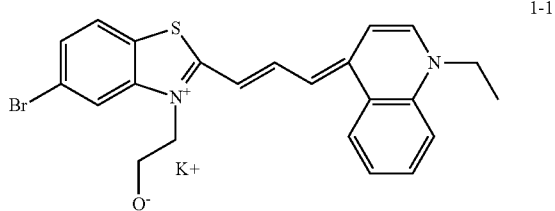 [SMILES: CCN1C=C/C(=C\C=C\c2sc3ccc(Br)cc3[n+]2CC[O-])c2ccccc21 ; [K+]]

1-1

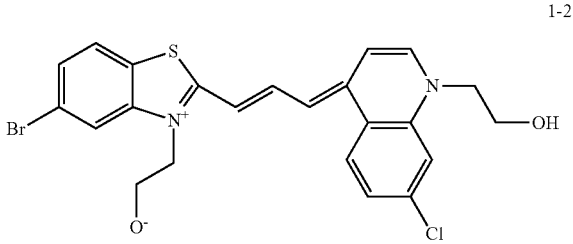 [SMILES: [O-]CC[n+]1c(/C=C/C=C2\C=CN(CCO)c3cc(Cl)ccc32)sc2ccc(Br)cc21]

1-2

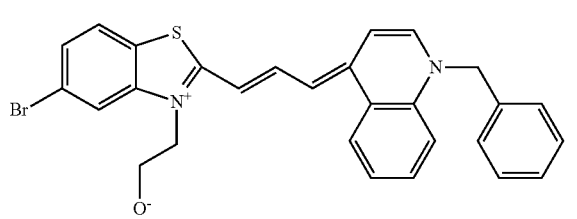

1-3

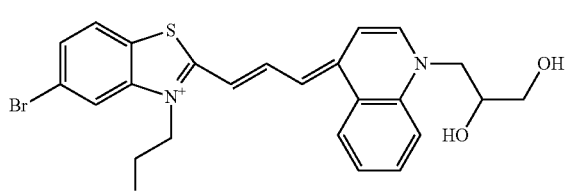

1-4

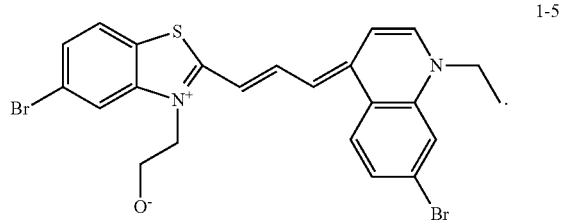

1-5

3. The fluorescent composition of claim 1, wherein the compound of Chemical Formula 1 is any one selected from compounds represented by the following Chemical Formula

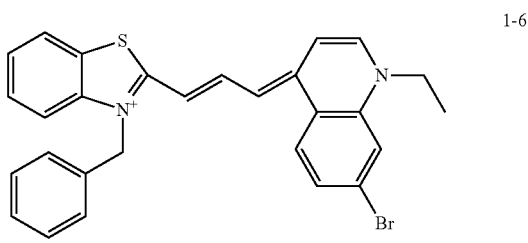 [SMILES: CCN1C=C/C(=C\C=C\c2sc3ccccc3[n+]2Cc2ccccc2)c2ccc(Br)cc21]

1-6

4. The fluorescent composition of claim 1, wherein the compound of Chemical Formula 1 is any one selected from compounds represented by the following Chemical Formula 1-45
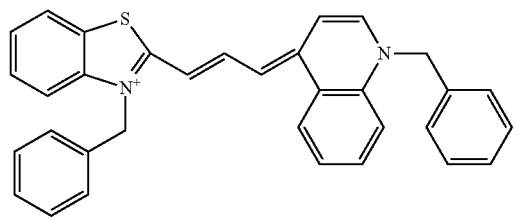
1-46
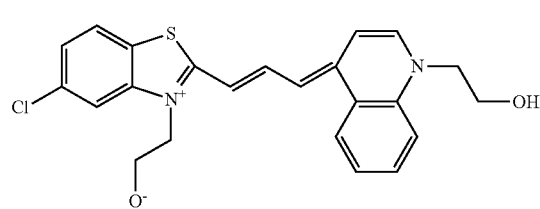
1-52
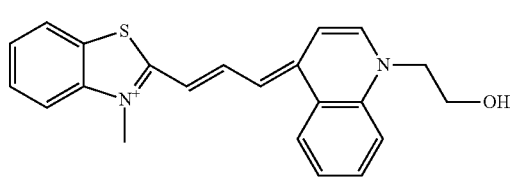
1-53
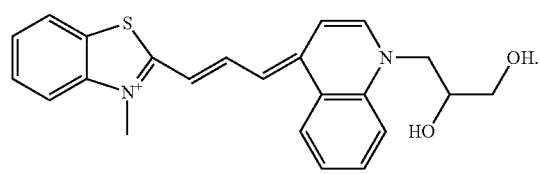
5. The fluorescent composition of claim 1, wherein the compound of Chemical Formula 1 is any one selected from compounds represented by the following Chemical Formula
1-18
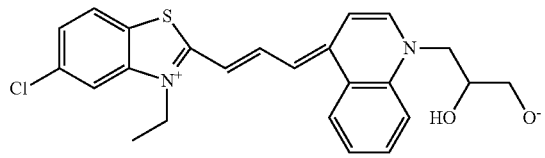
1-19
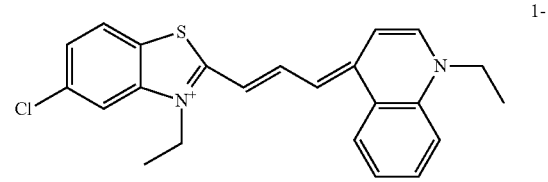
1-20
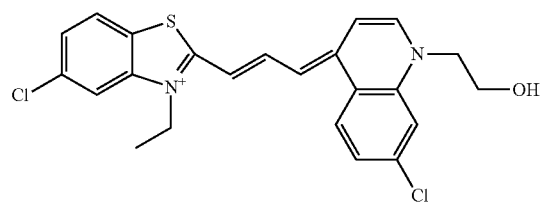
1-24
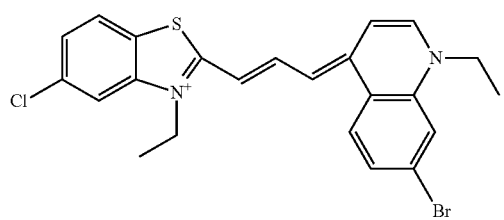
1-25
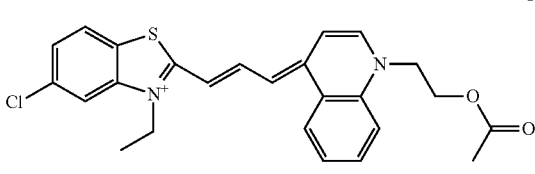
1-26
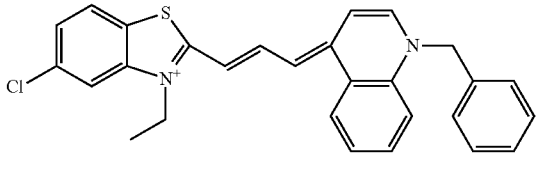
1-27
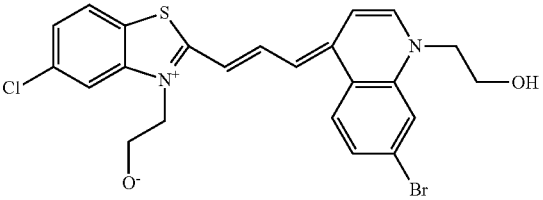
1-28
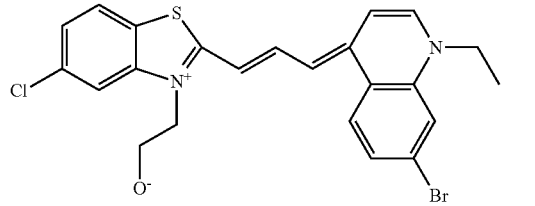
1-29
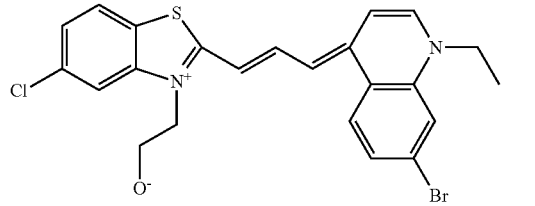
1-30
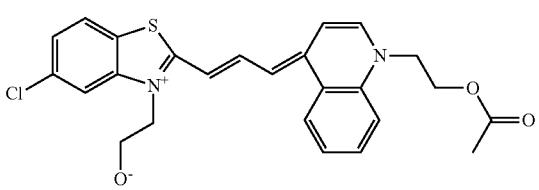

-continued 1-31
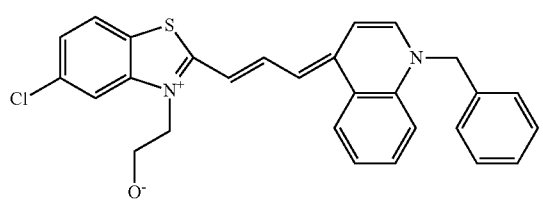

1-32
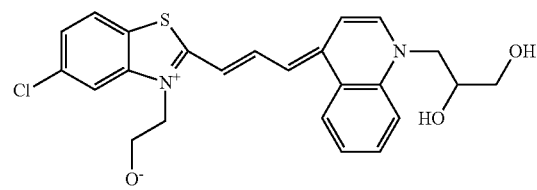

1-33
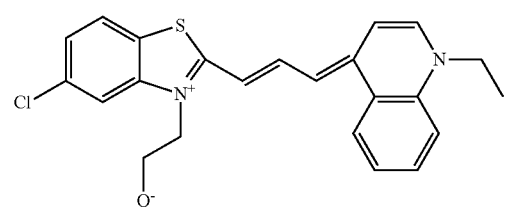

1-34
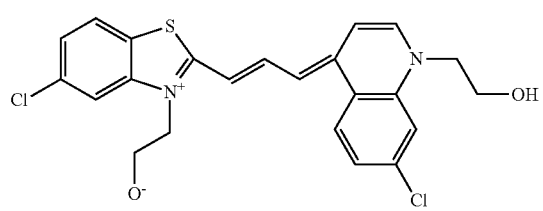

1-49
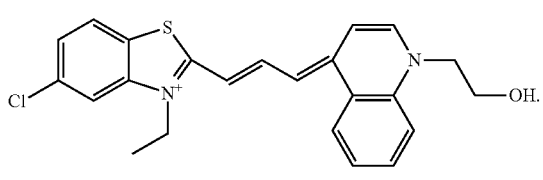

6. The fluorescent composition of claim 1, wherein the compound of Chemical Formula 1 is any one selected from compounds represented by the following Chemical Formula 1-21
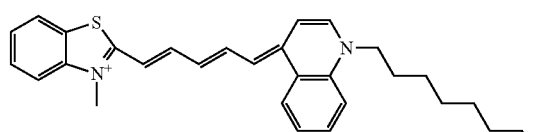

1-22
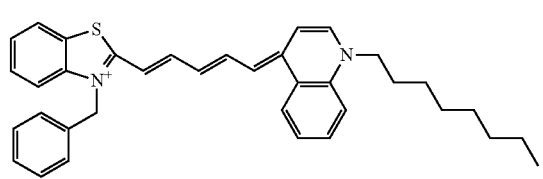

-continued 1-23
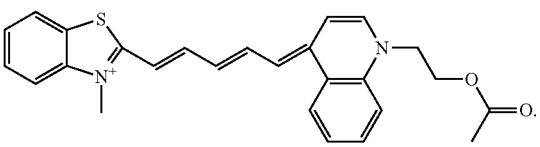

7. The fluorescent composition of claim 1, wherein the compound of Chemical Formula 1 is any one selected from compounds represented by the following Chemical Formula 1-35

1-36

8. The fluorescent composition of claim 1, wherein the compound of Chemical Formula 1 is any one selected from compounds represented by the following Chemical Formula 1-39

1-41

1-42

-continued 1-43
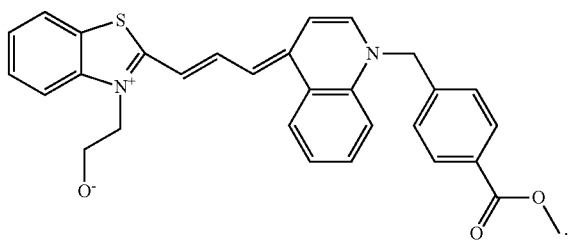

9. The fluorescent composition of claim 1, wherein the compound of Chemical Formula 1 is any one selected from compounds represented by the following Chemical Formula 1-44
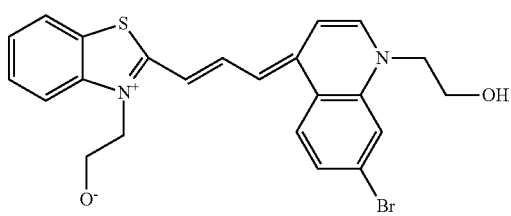

1-48
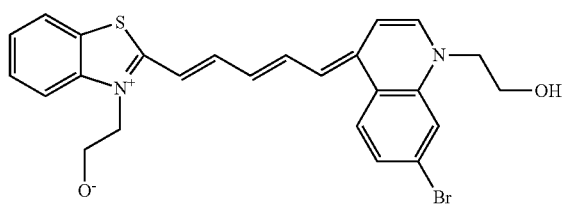

1-55
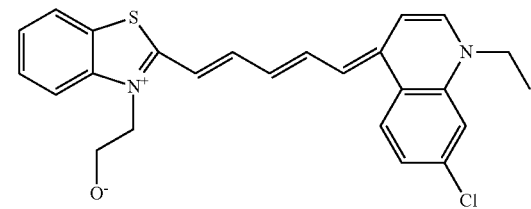

1-57
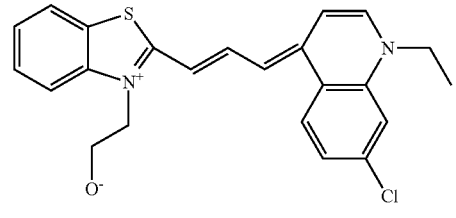

1-59
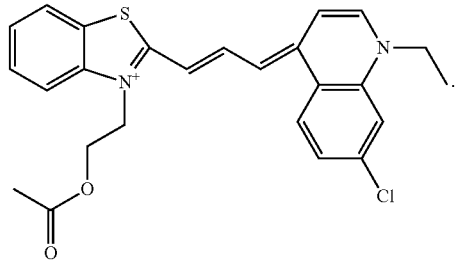

10. The fluorescent composition of claim 1, wherein the compound of Chemical Formula 1 is any one selected from compounds represented by the following Chemical Formula 1-47
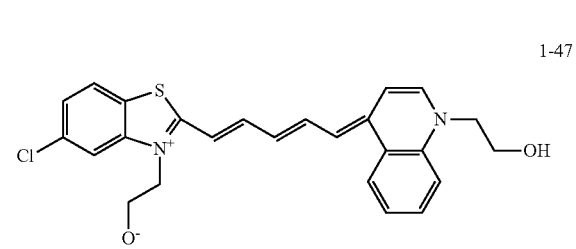

1-50
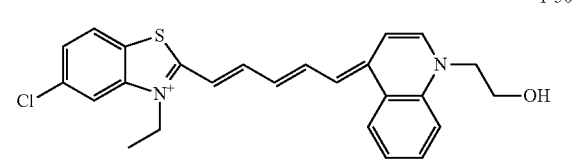

1-51
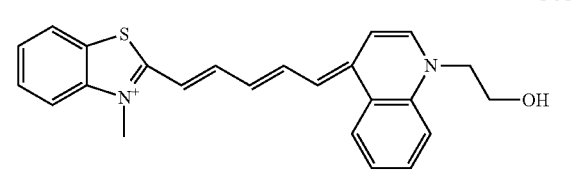

1-54
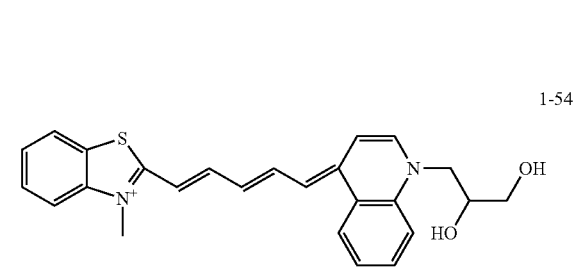

1-58
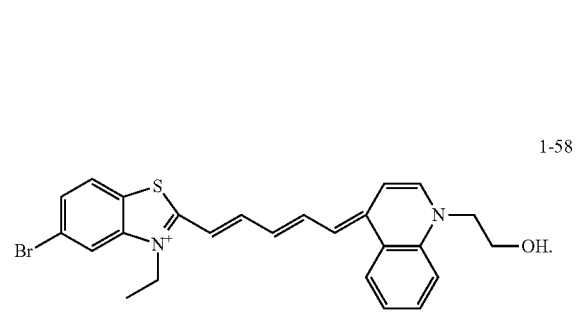

11. The fluorescent composition of claim 1, wherein the compound of Chemical Formula 2 is selected from compounds represented by the following Chemical Formula 3

[Chemical Formula 3]

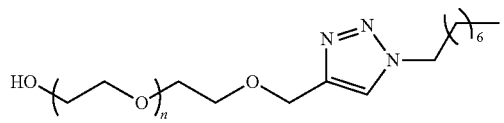

Wherein, n is 8 or 9.